INVENTOR.
Louis L. Terry
BY
ATTORNEY

United States Patent Office 3,412,795
Patented Nov. 26, 1968

3,412,795
METHOD OF CEMENTING WITH REVERSAL OF FLOW OF THE SLURRY
Louis Lyman Terry, Great Bend, Kans., assignor to The Dow Chemical Company, Midland, Mich., a corporation of Delaware
Filed Feb. 13, 1967, Ser. No. 615,676
5 Claims. (Cl. 166—21)

ABSTRACT OF THE DISCLOSURE

An improved method of emplacing an aqueous hydraulic cement slurry in a space between confining walls, particularly when at least one thereof is the face of an earthen formation, which comprises injecting the slurry in a turbulent state in a surging action, attained by forcing the slurry beyond its ultimate place of emplacement and then reversing its flow back in the direction of ultimate emplacement. The forward and reverse direction of flow may be repeated if desired.

---

Figure 1:
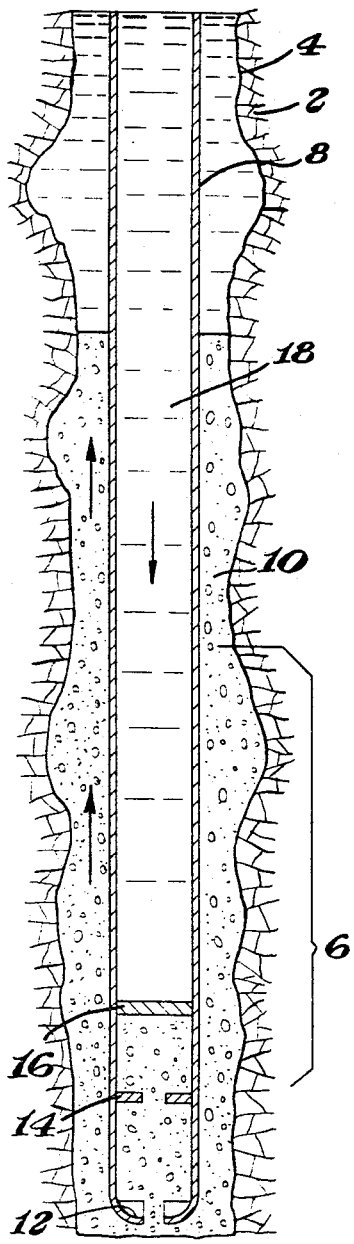

The invention is an improvement of cementing methods wherein a hydraulic cement slurried in a liquid, usually water or brine, is conveyed from a place of preparation or temporary storage to the location wherein a solid unitary or monolithic mass of set cement is desired to be emplaced. An example of such cementing is that associated with wells, e.g., oil, gas, brine, or fresh water wells. In such wells, cement is used to secure well casing in place, to seal off encroaching unwanted fluids, and in general to provide for more efficient production of a desired fluid from a fluid-bearing geological formation penetrated by such well with a minimum of loss or contamination.

It has recently been discovered that a turbulent state in an aqueous slurry during its emplacement into a cavity, wherein attainment of a good bond with the earth is an objective, aids materially in the realization of such objective. The turbulent flow enables the cement slurry to more effectively and completely remove pumpable rotary drilling mud and to some extent scrub off the mud cake which is formed on the well bore wall during drilling. Also the scrubbed off mud is well distributed throughout the slurry. As a result, the bore wall is clean and the cement can effect a secure bond to it when it sets. Also the effect of the mud within the cement is minimized, resulting in generally stronger cement. Drilling mud, because it has an earthen base and more particularly contains additives which retard the setting of cement, can severely weaken any portion of a cement slurry which contains slugs of mud.

Such turbulence can be realized by injecting the cement slurry at a high rate of injection. This requires, normally, the expenditure of high energy and the incurrence of unusually high pumping costs. However, it has been found that admixture of certain additives, known as turbulence inducers, with the cement slurries prior to or during the injection thereof, effects a desirable change in the rheological properties of the slurry to the extent that a state of tubulence is attained at a much lower pumping rate, and hence much more economically than in the absence of such additive.

It has also been recently suggested that the use of an amount of cement in excess of that needed in a cementing operation whereby the initially injected cement is pushed beyond the place where it is actually needed, improves the bonds formed between the face of an earthen formation and the set cement. This technique obviously has serious economic drawbacks because the use of such excessive amounts of cement (especially neat cement employed in cementing wells) represents an appreciably high initial cost and the injection of excess volumes thereof materially increases the cost of emplacing the slurry. Accordingly, such practice has not been favorably received by well owners.

My invention provides a method of combining the desired turbulent state with additional contact time of the cement slurry with the surface with which bonding is desired.

The invention contemplates and includes an improved method of emplacing an aqueous hydraulic cement slurry in a space between confining walls to provide improved bonding of the cement of such walls, when set to a solid, which comprises injecting the slurry into such space in a turbulent state in a surging action.

There are innumerable instances where it is desirable that cement slurries be emplaced between confining walls forming firm, durable bonds with the walls. Of particular concern, however, are those instances where one or both walls consist of the exposed face of an earthen or geological formation.

Illustrative of confining earthen walls are voids existing in the construction of dams, retaining walls and the like; between liners of vertical shafts extending into the earth and the face of the exposed earth; between tunnel liners or the like and the surface of the earth through which the tunnel passes; between the casing of a well penetrating a geological formation, particularly where the casing is of an unusually large diameter such as is employed for use of personnel and equipment, as are used in high explosive tests conducted in mined-out formations, e.g., excavated or solubilized salt formations where personal safety and protection of equipment require that water seepage between the formation and the shaft liner be eliminated.

Turbulence may be attained merely by pumping a cement slurry at a very high rate. However, it is recommended that turbulence be induced by admixing with the cement slurry a turbulence inducer, e.g., the lithium salt or lithium-sodium mixed salt of the condensation product of mono-naphthalene sulphonic acid and formaldehyde, as described in Ser. No. 598,664, filed Dec. 2, 1966 e.g., on p. 7 thereof. The amount of such compound employed may be between about 0.07% and about 20%, based upon the dry weight of the cement employed, but is usually between 0.1% and about 1.5% based on the dry weight of cement present.

A state of turbulence of an aqueous cement slurry is a recognized and a measurable condition based upon the measurements and calculations described in Ser. No. 598,664 on p. 18 to 20 thereof.

Extended time of turbulence flow of the cement slurry across a surface to which it is desired to be firmly bonded, essential to the attainment of the objectives of the invention as aforesaid, is accomplished by surging of the cement slurry. By the expression, surging, is meant moving the cement slurry first in one direction and then in the opposite direction while in contact with the surface, e.g., formation wall.

In the cementing of a casing in a bore, it is necessary in the practice of the invention to cause the lead portion of the slurry being emplaced to be forced to the furthest extreme of the zone in which the cement is to be finally emplaced, and then the slurry to be moved back across the formation zone or interval where especially secure bonding of the cement is to be effected, at least one of such movements being at a sufficient velocity to result in the slurry being in a turbulent state of flow. However, it is preferred that a series of passes be made while so maintaining the slurry in contact with the confining walls with which secure bonding is desired, e.g., between about 4 and 10 such passes, a large number thereof being conducted at a velocity sufficient to result in the slurry being in a turbulent state.

A broad description of the invention is set out below which describes how the invention may be conducted in accordance with a series of steps, wherein a cement slurry is to be used to cement casing in a well. Some of the steps set out herein below are clearly optional and are not limiting upon the practice of the invention.

*Step 1.*—A conventional fill-up baffle ring is incorporated at or near the bottom of the casing when the casing is lowered into the bore hole. This device cooperates with a subsequently lowered latch-down plug which thereby permits cement slurry flow out of and around the lower end of the casing and up into the annulus so long as is desirable, but which can be controlled to prevent return flow back into the casing when surging has been completed and the slurry is desired to be held static for setting.

*Step 2.*—A volume of water, to clean and flush the wellbore, which may, if desired, contain acid, detergents or other chemicals in accordance with known practice, may be pumped down the wellbore for the purpose of removing as much as possible of drilling mud from the annulus.

*Step 3.*—A volume of cement slurry is prepared which is sufficient to provide: an amount which, when injected, is adequate to extend up into the annulus between the casing and formation wall to a distance sufficiently high above the interval to be securely cemented to allow the slurry to drop, as pressure on the slurry in the casing is released and a portion of the slurry returned to the casing, without the level of the slurry in the annulus dropping appreciably below the top of the interval where secure cementing is required. It is recommended that a turbulence inducer, as hereinabove described, be admixed with the slurry. If desired, a dispersant, an accelerator, an antiforming agent, and/or a retardant to the setting rate of the cement slurry may also be admixed therewith. The choice and amount of such special additives to use is dependent upon a number of factors among which are the cementing conditions, e.g., temperature of the ambient air and of the formation and the class of cement employed.

*Step 4.*—The cement is then pumped down the casing followed by the latch-down cementing plug. The plug is followed by a displacing fluid, e.g., water, oil, or mud, which is usually of less density than the cement slurry. The slurry is thereby displaced out of the casing at the lower end and up into the annulus between the casing and the formation. The rate of injection is optional so long as a turbulent state is caused to exist in the slurry as it flows through the annular space between the casing and the borehole wall during at least some and preferably all of the injection period.

*Step 5.*—Displacement from the casing is continued until the cement has substantially all been displaced into the annulus to a height sufficently above the zone requiring secure cementing to permit a portion of the slurry, as aforesaid (upon release of injection pressure on the slurry in the casing, as stated in the next step below) to flow back into the casing but which will not thereby permit the top level of the slurry in the annulus to fall substantially below the top of the interval requiring secure cementing.

*Step 6.*—The pressure on the slurry in the casing is then released whereupon a portion of the slurry flows back into the casing at a flow rate preferably sufficiently to induce turbulent flow until the level of the slurry in the annulus has dropped to the top of the interval requiring secure cementing. The rate of return flow may be aided by forcibly pumping liquid into the annulus at the surface.

*Step 7.*—Pressure is again put on the cement slurry in the casing which thereby forces slurry out of the casing again and upwardly in the annulus to a point above the zone ultimately requiring secure bonding of the cement, similarly as in Step 5 above.

*Step 8.*—The pressure is again released on the cement in the casing and a portion of the cement in the annulus allowed to flow back or is pumped back from the annulus into the casing, to repeat the operation of Step 6.

*Step 9.*—Pressure is applied once more to the cement slurry in the casing to force it out of the casing and up the annulus, this time, however, to the extent that the latchdown plug comes into locking, closing contact with the baffle ring in the lower part of the casing to prevent the return flow of the cement slurry back into the casing.

*Step 10.*—The cement slurry, now largely in the annulus across the interval requiring secure cementing but also extending thereabove, is allowed to set to a solid. It thereby forms secure, firm bonds between the casing and the formation wall at the interval when such is required.

The invention will be better understood by reference to the annexed drawing.

In the drawing, the various features or elements thereof are designated by the following numerals: 2 represents a geologic formation; 4 is a wellbore extending thereinto; 6 is an interval from which petroleum will be produced and through which casing 8 positioned in the wellbore is to be securely bonded to the wall of the formation; 10 is aqueous cement slurry to be positioned in part across interval 6; 12 is a casing shoe and 14 an automatic fill-up latch-down baffle; 16 is a cement latch-down plug which serves as a separator between displacement fluid and cement slurry during injection but which, when brought into contact with fill-up baffle 14, locks thereto and prevents return of cement slurry into the casing from the annulus.

FIGURE 1 illustrates a cased wellbore of a well near the close of Step 5 of the broad description of the method of the invention showing the cement slurry being initially injected in a turbulent state whereby the upper portion thereof in the annulus between the casing and borehole or formation wall is at a level appreciably above the interval 6 requiring protection by emplacing securely bonded cement.

Figure 2:
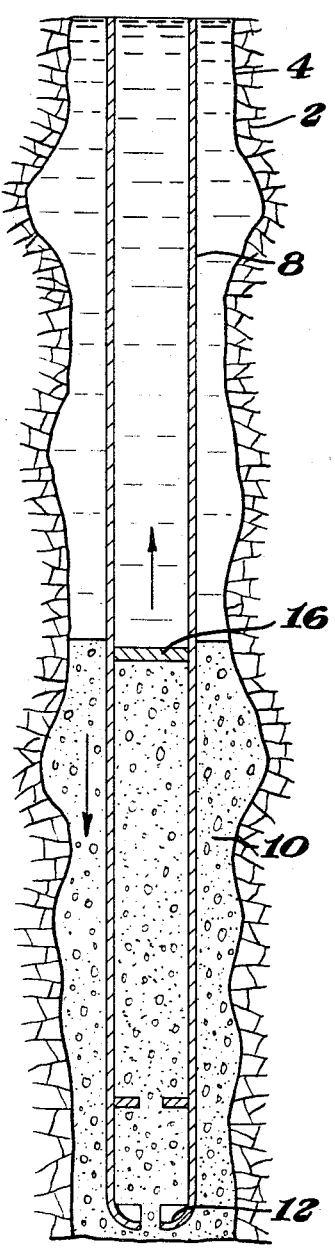

FIGURE 2 illustrates the same wellbore as that shown in FIGURE 1, at Step 6 of the broad description of the method of the invention showing the previously injected cement slurry being reversed out of the annulus back into the casing whereby the upper level of the slurry is being lowered and is approaching the top level of the interval 6.

Figure 3:
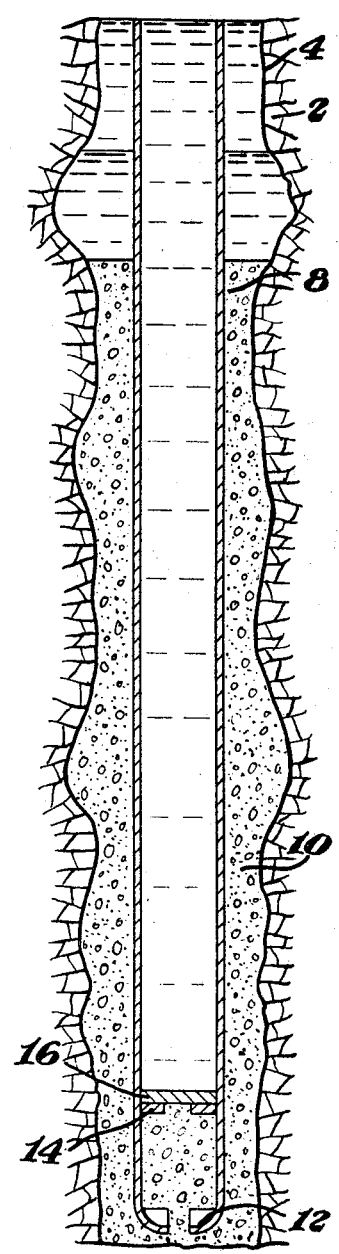

FIGURE 3 illustrates the same wellbore as that shown in FIGURES 1 and 2 at the close of Step 9 of the broad description of the method of the invention showing the slurry being finally forced from the casing into the annulus across and above the interval 6 requiring secure cementing. The latchdown plug 16 is retained by baffle 14 thereby closing off return of cement slurry to the casing.

*Example*

The following example illustrates the practice of the invention: A wellbore 3,850 feet deep, which had been drilled with a rotary drill providing a diameter of 7⅞ inches, is cased to total depth with a 5½ inch casing. The cement is to be emplaced in the annulus between casing and formation to give secure bonding of the casing to the formation in the interval between the levels of 3,430 feet and bottom of the casing. The cementing conditions suggest that an approximate contact time of the cement slurry, while in a turbulent surging motion, with the formation wall prior to set, should be about 14 minutes in order to efficiently remove pumpable rotary drilling mud and as much as possible of the residual mud cake from the wellbore wall.

Calculations show that turbulent flow is attained during injection of the cement slurry at an injection rate of four 42-gallon barrels per minute or greater.

The cement is emplaced as follows:

*Step 1.*—A fill-up baffle ring is installed in position 30 feet from the bottom of the casing as the casing is run into the wellbore. The ring is finally positioned at the 3,820 foot level of the wellbore.

*Step 2.*—13 barrels of a cleaning chemical solution according to known practice are circulated down the casing and up the annulus to aid in removing drilling mud therefrom.

*Step 3.*—144 sacks consisting essentially of 50 parts class A portland cement and 50 parts by weight pozzolana cement and containing 0.5 part of the salt of the condensation product of formaldehyde and mono-naphthalene sulfonic acid (as a turbulence inducer), 2 parts bentonite (as a thickening agent) and 10 parts by weight NaCl, to minimize formation damage by the water of the slurry, are admixed with sufficient water to make a pumpable cement slurry.

*Step 4.*—The cement slurry so prepared is then pumped down the casing, followed by a latchdown plug and that in turn by mud, thereby forcing the cement slurry through the open baffle ring and thence upwardly in the annulus at the desired rate of 4 barrels per minute to achieve turbulence. A sufficient amount of the cement slurry is displaced to raise the level thereof in the annulus substantially above the 3,430 foot level. The slurry made a turbulent, scrubbing contact time of 4 minutes with the formation wall across the interval between the bottom of the casing and the 3,430 foot level.

*Step 5.*—The pressure on the cement in the casing is released and about 10 barrels of the slurry allowed to flow back into the casing at a controlled rate to give a turbulent, scrubbing contact time of about 2.5 minutes with the formation interval below 3,430 feet.

*Step 6.*—About 10 barrels of the cement slurry in the casing is again forced back into the annulus at a rate of about 4 barrels per minute. This again gives a contact time of 2.5 minutes below 3,430 feet.

*Step 7.*—The casing pressure is again released and 10 barrels of cement slurry allowed to flow back into the casing. The rate of back flow is controlled to give a contact time again of 2.5 minutes.

*Step 8.*—10 barrels of the cement slurry are again pushed out of the casing into the annulus and the latchdown plug brought into locking engagement with the baffle ring to prevent back flow of slurry from the annulus into the casing. The last movement of the slurry is controlled again to give a contact time of 2.5 minutes.

The well is then closed in to allow the slurry to set. A calculation of the total turbulent contact time shows there to have been a total of 14 minutes.

Examination of the cementing job shows an unusually strong bond to exist between the set cement and the formation wall, a condition which is highly desirable to prevent more effectively the encroachment of undesired fluids and to prevent the loss of fluid sought to be produced from the formation.

Having described my invention, what I claim and desire to protect by Letters Patent is:

1. The method of emplacing a fluid cement slurry in a space between lateral confining walls to provide improved bonding of the cement to such walls, after the cement has set to a unitary solid, which comprises: injecting the slurry into such space employing sufficient excess slurry to force some thereof beyond the space where improved bonding is to be provided; reversing the direction of the cement slurry to give it a backward motion and thereby move a portion thereof back through the space defined by the confining walls in which the bonding is to be improved, at least a part of the movement of such slurry, while in contact with the confining walls, being at a rate sufficient to produce a state of turbulence in the slurry, and allowing the cement so emplaced to set to a unitary solid.

2. The method according to claim 1 wherein the backward motion of the cement slurry is conducted in such manner as to move the slurry back sufficiently to force a substantial portion thereof out of the space in the confining walls and then again giving the slurry a forward motion thus forcing it again through the confining walls in a forward direction while in contact therewith thereby maintaining extended contact time between the cement slurry and the contacting walls while maintaining the slurry in a turbulent state at least part of the time.

3. The method according to claim 2 wherein the forward and backward motions of the cement slurry are repeated at least four times to give an extended surging effect.

4. The method according to claim 1 wherein a material is admixed with the cement slurry to induce a turbulent state therein thereby to lessen the rate of movement of the slurry otherwise necessary to attain such state.

5. The method according to claim 4 wherein the material admixed with the slurry to induce turbulence is the condensation product of formaldehyde and mononaphthalene sulfonic acid in an amount of at least about 0.01 weight percent based upon the weight of dry cement present.

References Cited
UNITED STATES PATENTS

| | | | |
|---|---|---|---|
| 1,842,106 | 1/1932 | Lytle | 166—28 |
| 2,675,082 | 4/1954 | Hall | 166—21 |
| 2,848,051 | 8/1958 | Williams | 166—28 |
| 3,196,946 | 7/1965 | Lauffer | 166—21 |
| 3,202,213 | 8/1965 | Howard | 166—21 |

OTHER REFERENCES

Marquaire, Roger, et al.: Primary Cementing by Reverse Circulation Solves Critical Problem in the North Hassi-Messaoud Field, Algeria, in J. Petroleum Technology, 18(2), February 1966, pp. 146–150.

JAMES A. LEPPINK, *Primary Examiner.*

I. A. CALVERT, *Assistant Examiner.*